US008970595B2

(12) United States Patent
de Loera et al.

(10) Patent No.: US 8,970,595 B2
(45) Date of Patent: Mar. 3, 2015

(54) DISPLAY AND INTERACTION WITH MULTIDIMENSIONAL DATA

(75) Inventors: Luis Efrain Regalado de Loera, Redmond, WA (US); Isaias Formacio-Serna, Redmond, WA (US); Ken Drake, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 13/282,434

(22) Filed: Oct. 26, 2011

(65) Prior Publication Data

US 2013/0106830 A1 May 2, 2013

(51) Int. Cl.
*G06T 11/20* (2006.01)
(52) U.S. Cl.
CPC .................................. *G06T 11/206* (2013.01)
USPC ............ 345/440; 345/419; 345/589; 715/853
(58) Field of Classification Search
USPC ............................. 345/419, 440, 589; 715/853
See application file for complete search history.

(56) References Cited

U.S. PATENT DOCUMENTS

| 6,167,396 | A | 12/2000 | Lokken | |
|---|---|---|---|---|
| 6,707,454 | B1 | 3/2004 | Barg | |
| 7,051,025 | B2 | 5/2006 | Kan | |
| 7,506,274 | B2 | 3/2009 | Zhang | |
| 2005/0114384 | A1* | 5/2005 | Beringer et al. | 707/102 |
| 2007/0130113 | A1 | 6/2007 | Ting | |
| 2009/0235267 | A1 | 9/2009 | Mckinney | |
| 2010/0231595 | A1 | 9/2010 | Dang | |
| 2011/0202888 | A1* | 8/2011 | Rusu et al. | 715/855 |

OTHER PUBLICATIONS

SAS, "Fact Sheet: SAS Enterprise Bi Server: Fast Deployment, Simple Integration and Consistent Data", Published on or Before Apr. 30, 2006.

* cited by examiner

*Primary Examiner* — Maurice L McDowell, Jr.
*Assistant Examiner* — Kyle Zhai
(74) *Attorney, Agent, or Firm* — Julie Kane Akhter; Danielle Johnston-Holmes; Micky Minhas

(57) ABSTRACT

Providing for graphical display of multidimensional data that improves user consumption of graphically rendered data is described herein. By way of example, the subject disclosure provides organization of multidimensional data into a graphical chart that can accommodate four or more dimensions of data on a single chart display. In a particular aspect, the graphical chart can comprise a core with a plurality of stems that branch outward from the core, having respective sub-topics of the multidimensional data assigned to respective stems. Stems can terminate in sets of bubbles, each sized according to quantitative significance of associated data, prominently presenting that significance. Bubbles can serve as lower level sub-topics for other sets of bubbles, providing recursive depth in the graphical chart to depict still more dimensions of data. Zoom controls, feature selection and custom data generation can provide usability features to enhance user experience.

18 Claims, 13 Drawing Sheets

DISPLAY AND INTERACTION WITH MULTIDIMENSIONAL DATA

TECHNICAL FIELD

The subject disclosure relates generally to visualization and display of multidimensional data, and more particularly to graphical display of multidimensional relational data at least in a two-dimensional display, and graphical interaction with levels of displayed data at multiple levels of abstraction.

BACKGROUND

Computer browsing applications generate user value by providing effective and useful platforms for presenting and depicting information, with varying mechanisms for abstracting data and providing context for information that is displayed. Presentation of large quantities of data in a manner that can be quickly consumed by the user continues to be a challenging design objective for browsing applications. As further design iterations of existing mechanisms approach an asymptotic relationship with increases in effectiveness or utility of those mechanisms, new paradigms in the presentation of multidimensional data become increasingly attractive.

Graphical displays of quantitative data associate respective data values with graphical structures, such as bars, circles, pie-sections, and so on. These graphical displays improve user consumption of data by providing a visual rendering of relationships between quantitative values that can be quickly seen by a viewer. Early graphical displays correlate different dimensions of a graphical display or chart, such as horizontal dimension and vertical dimension, with different dimensions of the data. A common two-dimensional display, for instance, can depict a list of entities in a first dimension with a corresponding set of quantitative values or qualitative characteristics (e.g., colors) in a second dimension. Several methods have been developed to expand beyond the simple two-dimensional display. As an example, multiple two-dimensional charts can be employed to depict three dimensions of data. Alternatively, three dimensional charts can depict three dimensions of data on a single chart. And of course, multiple three dimensional charts can be employed to depict a fourth dimension of data. The obvious limitation, of course, is that the number of dimensions of data that can be displayed in a single chart is limited by the number of dimensions that can be depicted in a graphical display.

While utilization of multiple charts increases contextual dimension of a graphical display, it also adds to a user's mental overhead, by requiring the user to mentally link two or more charts and their associated data together. This increased mental overhead tends to slow down user consumption of data. Moreover, multidimensional charts having large amounts of data can become prohibitively complex for a viewer, dramatically slowing data consumption.

In addition to mental overhead, complex multidimensional charts can be difficult to construct and interact with. User interaction with a graphical display can provide additional value, allowing a user to quickly change and update data, focus on subsets of the data to enhance understanding of the information presented, understand relationships between subsets of data, and so on. Simple graphical charts like pie charts, bar charts, line charts, etc., offer limited user interactivity, however. Furthermore, these charts are limited to a linear and often rigid presentation of relativistic data (e.g., bars, lines, pie sections). Moreover, space limitations on the amount of information that can be displayed at a given time tend to be restrictive.

The above-identified deficiencies of today's graphical displays and data charts are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In an example embodiment, a method comprises positioning a highest level overview of a set of relational data near a predefined line of a graphical display and forming a plurality of stems that branch outward from the centerline, and assigning respective sub-topics of the set of relational data to respective ones of the plurality of stems. The highest level overview can correspond with a title of a matrix of multidimensional data, whereas sub-topics can include a set of sub-categories of the matrix. Moreover, sub-sub-topics of the matrix can be included within other sub-topics, providing a high degree of granularity to the display of relational data. Further to the above, the method can comprise generating a bubble near an end of one of the plurality of stems, and including with the bubble an instance of relational data that is pertinent to a particular sub-topic assigned to the one of the plurality of stems. Additional dimensions of information can be added as data qualifiers, correlated for instance with different colors of the bubble, to qualify the instance of relational data, with different widths or width segments of a stem, to qualify a sub-topic associated with the stem, and the like.

In another example embodiment, an apparatus for displaying multidimensional data in a chart comprises a processor that facilitates executing instructions stored in memory to generate the chart, comprising a plurality of stems branching outward from a core associated with a highest level overview of the multidimensional data and terminating in respective stem-heads, the respective stem-heads are assigned respective sub-topics of the multidimensional data. Additionally, the chart can comprise a set of bubbles located within at least one of the respective stem-heads and positioned within the at least one of the respective stem-heads according to a positioning algorithm, wherein respective bubbles of the set of bubbles include respective instances of the multidimensional data that are pertinent to a sub-topic assigned to the at least one of the respective stem-heads.

In yet another example embodiment, a non-transient computer-readable medium comprises computer-readable instructions that, in response to execution facilitated by a processor, cause a system to perform operations. These operations can include accessing sets of data that are correlated with a category of data and assigning respective data sets of the sets of data to respective graphical bubbles. In addition, the operations can include establishing a size for the respective graphical bubbles at least in part based on a correlation between the respective sets of data and a criterion of the category of data. Further to the above, the operations can include positioning a graphical bubble of the respective graphical bubbles within a graphical shape assigned to the category of data in response to execution of a positioning function, wherein the positioning function is configured to center within the graphical shape respective ones of the graphical bubbles having relatively large size, and position respective ones of the graphical bubbles having relatively small size opportunistically among the respective ones of the graphical bubbles having relatively large size.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
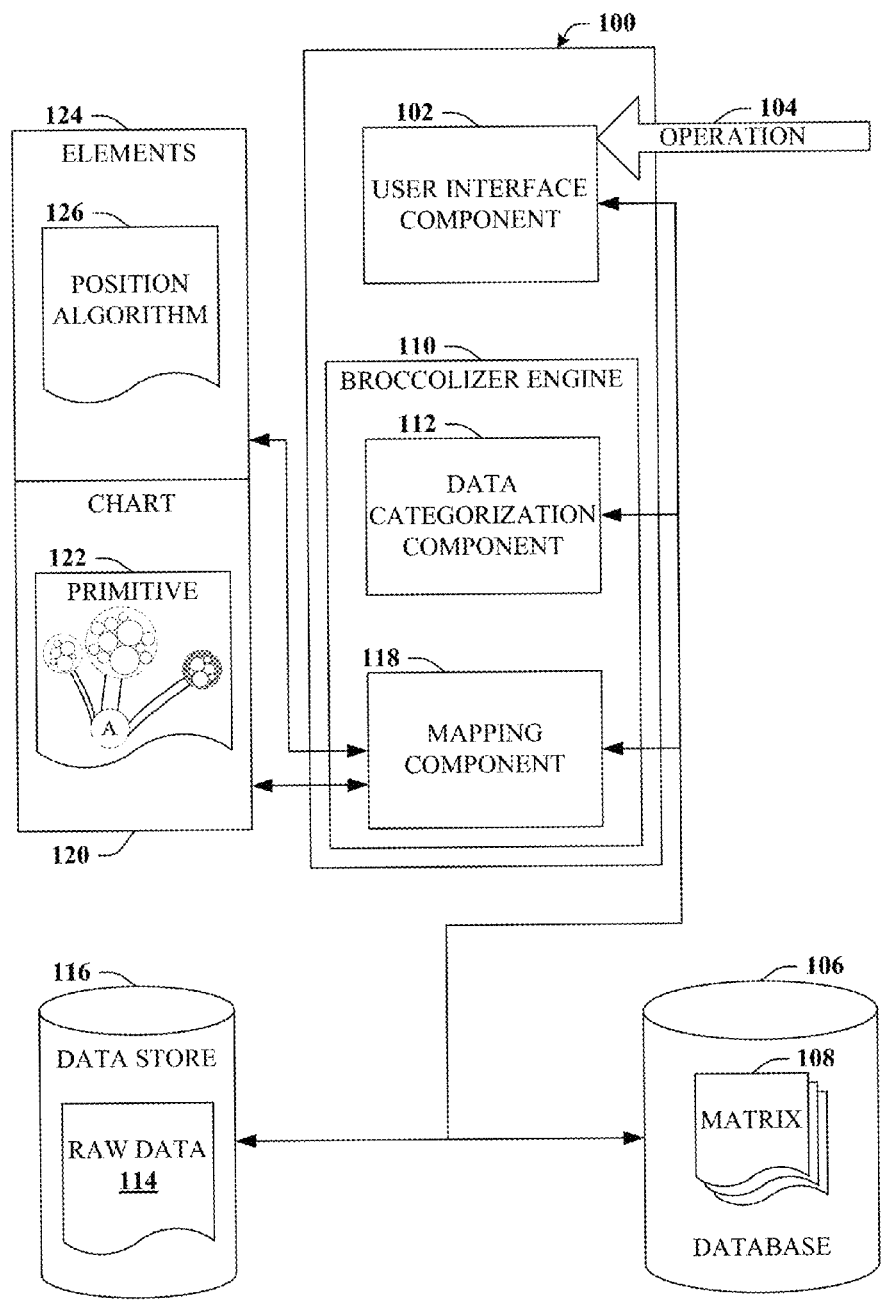
FIG. 1 illustrates a block diagram of an example system that generates a multidimensional chart of multidimensional relational data according to an aspect.

As indicated in the background section, graphical representation of complex multidimensional matrices can be difficult to achieve in a manner that provides rapid consumption of a large amount of information, minimizing user overhead in mentally correlating higher order data relationships (e.g., four or more dimensions), or data abstractions (e.g., different contextual implications for different subsets of data). Furthermore, providing a relational graph having a high degree of user interaction with the data can result in user friendliness and a good user experience.

In this regard, two and three dimensional graphs that strictly correlate physical dimensions (e.g., length, width, depth, . . . ,) with dimensions of data are limited in overall user data consumption rates. Especially for graphical display of complex matrices having large amounts of data, the user experience is still somewhat archaic and primitive. A paradigm shift in presenting relational data could be greatly appreciated by users of a wide range of computer applications, from web browsers, to spreadsheets, word processing applications, presentation applications, and so on, whether implemented at a local client or remotely on a cloud system, or some suitable combination thereof.

The term "dimension" when referring to data is a vernacular term for an aspect, category or qualification of the data. As an illustrative example, data representing yearly expenditures of an organization can include quantities of individual expenses, which can be separately compiled for different groups of the organization, over a range of time periods, and for different projects involving subsets of the groups. Each of these categories, the individual expense quantities, and the compiled quantities for the groups, for the range of time periods and for different projects can be separate dimensions of the data, yielding four dimensions so far. Additional dimensions can include statistical compilations for the individual expenses or compiled expenses (e.g., percentage of the organization's total expenses per dimension, an average expense per dimension, etc.), further qualifiers for the groups, time periods or projects, including sub-groups and sub-sub-groups, internal projects, external projects, and both internal and external projects, and so on. Virtually any suitable aspect, category or qualification can serve as a dimension. Further, the term "dimension" can be utilized herein to refer to a particular aspect, category or qualification of data, or in the general sense of unspecified aspects, categories or qualifications of the data.

To address problems with graphical display of multidimensional data, and to improve user consumption of graphically rendered data and quality and facility of user interaction with such data, the subject disclosure provides organization of multidimensional data into a graphical chart that can accommodate four or more dimensions of data on a single graphical chart. In a particular aspect, the graphical chart can comprise a core with a plurality of stems that branch outward from the core, having respective sub-topics of the multidimensional data assigned to respective ones of the plurality of stems. The core can represent a high level title or summary of the multidimensional data, and text describing this title or summary can be displayed within or coincident the core.

Further to the above, sets of bubbles each representing an instance of the multidimensional data can be generated near respective ones of the plurality of stems. As used herein, the term "bubble" is a colloquial term that refers to a graphical entity representing an atomic unit of data within a multidimensional matrix presented in a graphical chart, positioned near an end of a stem of such a graphical chart, and included within one or more steam-heads for that stem. A bubble, as utilized herein, can be, but need not be the traditional shape of a bubble, e.g., a sphere or spheroid. A bubble can have any suitable geometric shape, whether two or three dimensions. The graphical orientation of clustering sets of bubbles near the end of an associated stem provides a visual perspective facilitating rapid consumption of data. Moreover, various other features within the scope of the disclosure (e.g., described explicitly or implicitly herein, or known in the art, or made known to one of ordinary skill in the art by way of the context provided by the subject disclosure), can be added to further improve data consumption, ease of use, user interactivity, or the like or suitable combinations thereof.

According to some embodiments, bubbles within the graphical chart are associated with respective quantities of the multidimensional data. These quantities can, for instance, be related to respective instances of data represented by those bubbles, and therefore assigned to those bubbles on that basis.

In other examples, quantities can be assigned to bubbles on a different basis. For instance, bubbles can be assigned a quantity in response to a user input selection, in response to a static association (e.g., all quantities having value of 1), a dynamic quantity, a quantity defined by a function, or the like, or a suitable combination thereof. Moreover, bubbles can have a size that is related to the respective quantities. This relation can be proportional, inverse proportional, defined by a function (e.g., proportional to a mathematical square of a quantity, a square root of a quantity, . . . ,), and so on. In this manner, bubbles having quantities associated with a larger percentage of a whole, for instance, will graphically stand out as being more significant than bubbles associated with smaller quantities. This relative sizing can rapidly convey significance of instances of data associated with large bubbles, increasing speed of user data consumption. In at least one embodiment, the graphical chart can approximate the shape of a vegetable or plant; in a particular embodiment, the graphical chart can approximate the shape of a cruciferous vegetable or plant.

In still other aspects of the subject disclosure, a set of bubbles can be arranged within a steam-head according to a packing function. The packing function can be configured to display respective bubbles without overlapping, in a manner that minimizes consumption of space. This can improve a density of data for a given amount of graphical space (e.g., screen space, sometimes referred to as screen real-estate, or the like). In a particular aspect, the packing function can be a gravity weighting function that positions respective bubbles closest to a calculated center of area (or center of mass, for uniform area to mass relationship) of a subset of bubbles having been positioned within the stem-head. The gravity weighting function can recalculate the center of area upon placement of each new bubble within the stem-head, until all bubbles are placed. In at least one aspect, the gravity weighting function can distinguish between internal spaces—spaces within the steam-head that are bounded by other adjacent bubbles—and external spaces—or spaces within the stem-head that are not bounded by other adjacent bubbles, when calculating a position of each respective bubble. In this aspect, internal spaces can be analyzed first to identify whether an internal space large enough for a given bubble exists, before analyzing external spaces. In this aspect, calculation time for large numbers of bubbles can be drastically reduced as compared to analyzing all open space within a stem-head indiscriminately.

In still other aspects, additional dimensions can be depicted in a graphical chart, in addition to dimensions of data represented by a core, stems, sets of bubbles, and stem-heads of the graphical chart. In a particular aspect, relative widths of respective stems can represent an additional dimension. In another aspect, relative widths of longitudinal segments of a single stem or group of stems can represent a further dimension. In yet another aspect, a color or shading of a stem or group of stems can represent still another dimension. Moreover, color or shading of a bubble or set of bubbles, or color, shading or diameter of a stem-head or set of stem-heads, or a suitable combination thereof, can represent still other dimensions of the data. In at least one further aspect, limitless multiple other dimensions of data can be represented by recursively generating stem-heads or groups of stem-heads within one or more other stem-heads, where each group within another group represents another dimension of data. By recursively delving into deeper layers within layers of stem-heads, very large or limitless numbers of dimensions can be displayed in a single graphical chart.

To facilitate ease of access to data within a graphical chart as described herein, a zooming feature can be implemented with the graphical chart. The zooming feature can enable a display to enlarge a subset of the graphical chart and proportionately re-display the subset in a larger area of the graphical chart. In one instance, a user selection (e.g., mouse click, keyboard entry or entries, light pen entry, touch-screen activation, . . . ,) can enlarge a selected feature of the graphical chart (e.g., a bubble, a set of bubbles, a stem-head, a stem, a core, . . . ). In another instance, a user selection can enlarge a selected feature sufficiently to display text associated with the selected feature, or enlarge the text associated with the selected feature without enlarging the selected feature. In still another instance, a user selection can define an area to be expanded to a full display area of an application displaying the graphical chart. In still other instances, a combination of the foregoing or of like zooming functionality can be implemented for the graphical chart.

In one embodiment, user controls can be implemented with various graphical charts of multidimensional data described herein. The user controls can facilitate finding, searching, etc., features of the graphical chart (e.g., bubble(s), stem-head(s), stem(s)), or text within the graphical chart (e.g., words, terms, quantities, symbols, drawings, etc.). A search result can optionally magnify a feature or text to a predefined size on the graphical display, or zoom into the graphical chart proportionately to depict the identified feature or text at the predefined size. The user controls can also facilitate setting different feature dimensions or qualities (e.g., stem length, stem width, stem color, bubble color), assigning dimensions of data to respective features for displaying those dimensions, adding supplementary charts (e.g., pie chart, bar chart, line chart, or additional broccoli chart), or the like, or suitable combinations thereof.

Other embodiments and various non-limiting examples, scenarios and implementations are described in more detail below.

Multidimensional Data Depicted as a Graphical Chart Having Features that Visually Denote Quantitative Prominence Referring to the drawings, FIG. 1 illustrates an example system 100 for generating a graphical chart from a matrix of data. Particularly, system 100 can receive multiple dimensions of data and organize respective subsets of data related to respective dimensions in a graphical chart having a plant-like features and characteristics. In at least one aspect, system 100 can generate a broccoli-shaped graphical chart having distinct visual features mapped to respective dimensions of data.

System 100 can comprise a user interface component 102 that facilitates electronic communication (e.g., commands, data input, data output) with a computer and a user of the computer. In some aspects, user interface component 102 can facilitate user access to a set of controls configured to provide manual control over the organization and display of data in the graphical display (e.g., see FIG. 8, infra). For instance, the set of controls can enable a user to correlate subsets of the multidimensional data with respective graphical features of the graphical display. Further, the set of controls can enable the user to specify quantitative ranges displayed on a particular feature, add supplemental charts (e.g., pie chart, bar chart, line chart, etc.) to depict additional dimensions of the data, and so on. Additionally, user interface component 102 can receive an operation 104 that points system 100 to a matrix of data 108 stored in a database 106 and initiates compilation and display of the graphical chart.

System 100 can further comprise a broccolizer engine 110 configured to generate the graphical chart from the matrix of data 108. Broccolizer engine 110 can comprise a data categorization component 112 configured to access subsets of raw data 114 from a data store 116. The subsets of raw data 114 can be data contained, for instance, in a particular column or group of columns of matrix of data 108, a particular row or group of rows of matrix of data 108, or a suitable combination thereof. Respective subsets of data can be provided to a mapping component 118, which is configured to associate the respective subsets of data with respective features of the graphical chart.

In some aspects of the subject disclosure, mapping component 118 can be configured to retrieve a set of chart primitives 122 contained in a chart file 120 for generating the graphical display. Chart primitives 122 can comprise, in at least one aspect, a core primitive, a stem primitive, a stem-head primitive, a bubble primitive, and optionally one or more supplemental chart primitives. Mapping component 118 can be configured to correlate respective subsets of data provided by data categorization component 112 to one or more chart primitives 122. Where user input specifies what subset of data is to be correlated to a particular primitive, mapping component 118 can be configured to follow the user input. Where user input does not specify what primitive a subset of data is to be correlated to, mapping component 118 can correlate the subset of data to a primitive according to programmed rules. Particularly, the programmed rules can analyze the subset of data in relation to other data within matrix of data 108. For example, data strings not within a particular column or row can be defined as a matrix title and associated with a core primitive. Data strings in column headers can be defined as sub-topics correlated to a stem primitive, or stem-head primitive, data strings in row headers can be defined as sub-topics or instances of data correlated to a stem-head primitive, or bubble primitive, and data quantities can be correlated to bubble primitives.

Once subsets of raw data 114 are correlated to chart primitives 122, mapping component 118 can access a set of algorithms 126 in a chart elements file 124. Algorithms 126 can be employed for positioning sets of bubbles associated with a stem within one or more related stem-heads of the stem. Algorithms 126 can comprise a sizing algorithm, which can determine a size of respective bubbles based on respective data quantities from matrix of data 108 associated with respective bubbles, and a position algorithm that locates respective bubbles within a stem-head(s) (e.g., see FIG. 5, infra). Once data is fully correlated with chart primitives, system 100 can compile the chart primitives and data into a graphical chart, and output the graphical chart.

Figure 2:
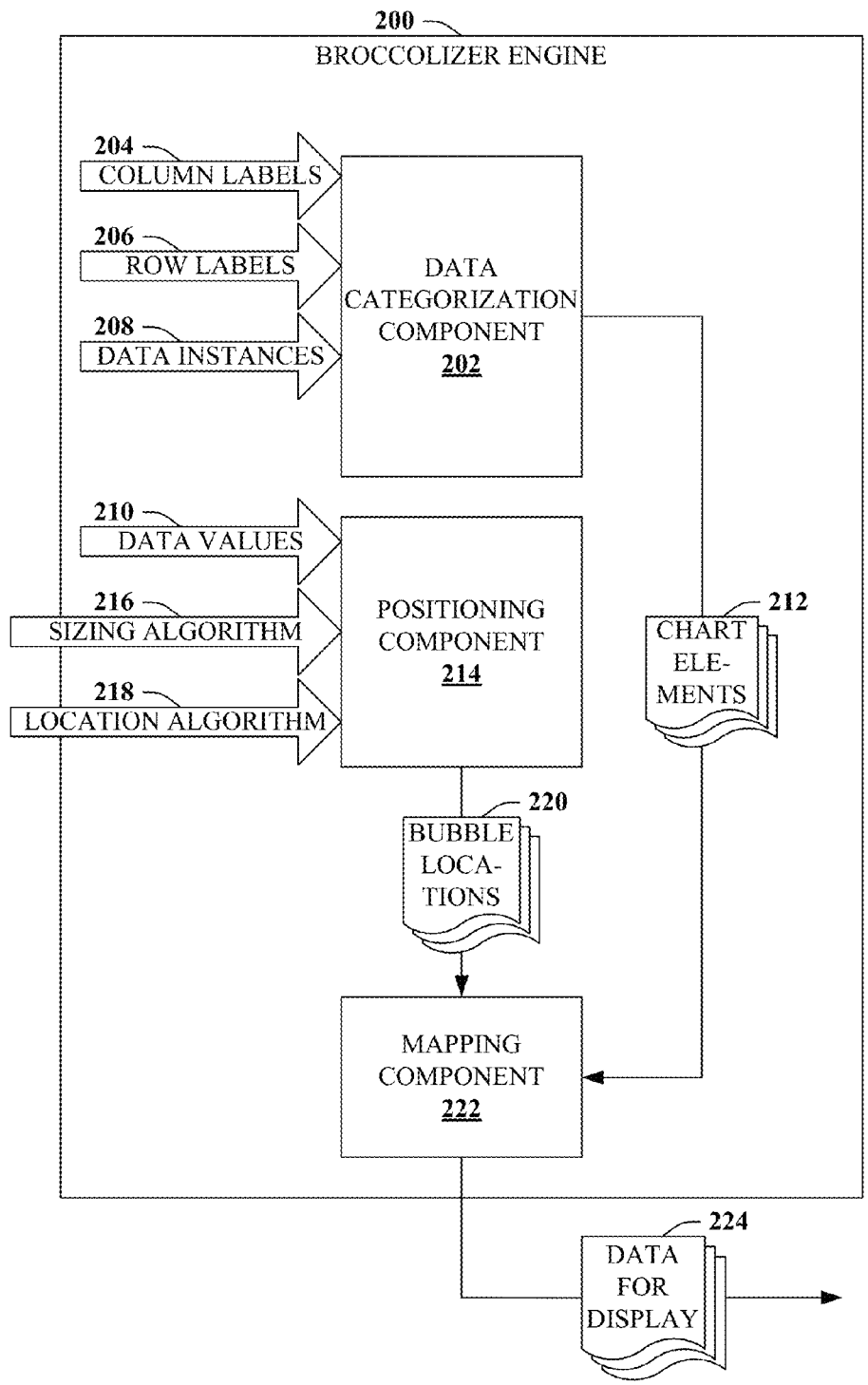
FIG. 2 depicts a block diagram of a sample "broccolizer" engine for generating a graphical chart of relational data having a cruciferous vegetable-type shape.

FIG. 2 illustrates a block diagram of an example broccolizer engine 200 configured to generate a graphical chart of multidimensional data. The graphical chart can visually highlight data according to quantitative value, drawing attention to quantitatively significant data, while minimizing display area consumed by the graphical chart.

Broccolizer engine 200 can comprise a data categorization component 202 configured to receive subsets of multidimensional data to be displayed with the graphical chart. For a matrix of data, the multidimensional data can comprise column labels 204, and row labels 206. Based on user input, or predefined data association rules, column labels 204 and row labels 206 can be correlated with higher-level features of the graphical chart, associated with relatively broad categories of data. Data instances 208 can comprise an atomic level of data. Groups of data instances 208 can be compiled under one or more row labels 206 or column labels 204, which in turn can be compiled under one or more other row labels 206 or column labels 204. The hierarchical relationship of atomic level data instances 208, row labels 206 and column labels 204 can be depicted as visually distinct features within the graphical chart, thereby quickly conveying complex relational aspects of data with a short visual analysis of the data.

Upon receiving and categorizing the multidimensional data, categorized data as elements of the graphical chart can be provided in a chart elements file 212 to a mapping component 222 for further processing into the graphical chart. In addition, broccolizer engine 200 can comprise a positioning component 214 configured to execute one or more algorithms for positioning elements of the graphical chart for display. The algorithms can include a sizing algorithm 216 for determining a size of respective bubbles of the graphical display, based at least in part on quantitative data associated with the respective bubbles. The quantitative data can be obtained from data values 210 of the multidimensional data that are correlated to the respective bubbles. Based at least in part on the size of respective bubbles, positioning component 214 can execute a location algorithm 218 to position respective bubbles within one or more stem-heads associated with the bubbles. Such association can comprise, for instance, data instances 208 of a set of bubbles that fall within a category (e.g., row label, column label, . . . ,) assigned by data categorization component 202 to the stem-head(s). In a particular aspect of the subject disclosure, location algorithm 218 can employ iterative center of mass or center of area calculations for positioning respective bubbles of a set of bubbles within a stem-head. Further, the iterative center of mass or center of area calculations can be configured to pack the bubbles into a relatively small area, thereby reducing graphical space consumed by display of the bubbles.

Positioning component 214 can provide a bubble locations file 220 to mapping component 222. Utilizing chart elements in chart elements file 212 and related associations of graphical features and multidimensional data, as well as bubble locations in bubble locations file 220, mapping component 222 can construct the graphical display of the multidimensional data. The constructed graphical display can be output in digital form in a data for display file 224, for display on a computer screen, television screen, or other suitable visual display.

Figure 3:
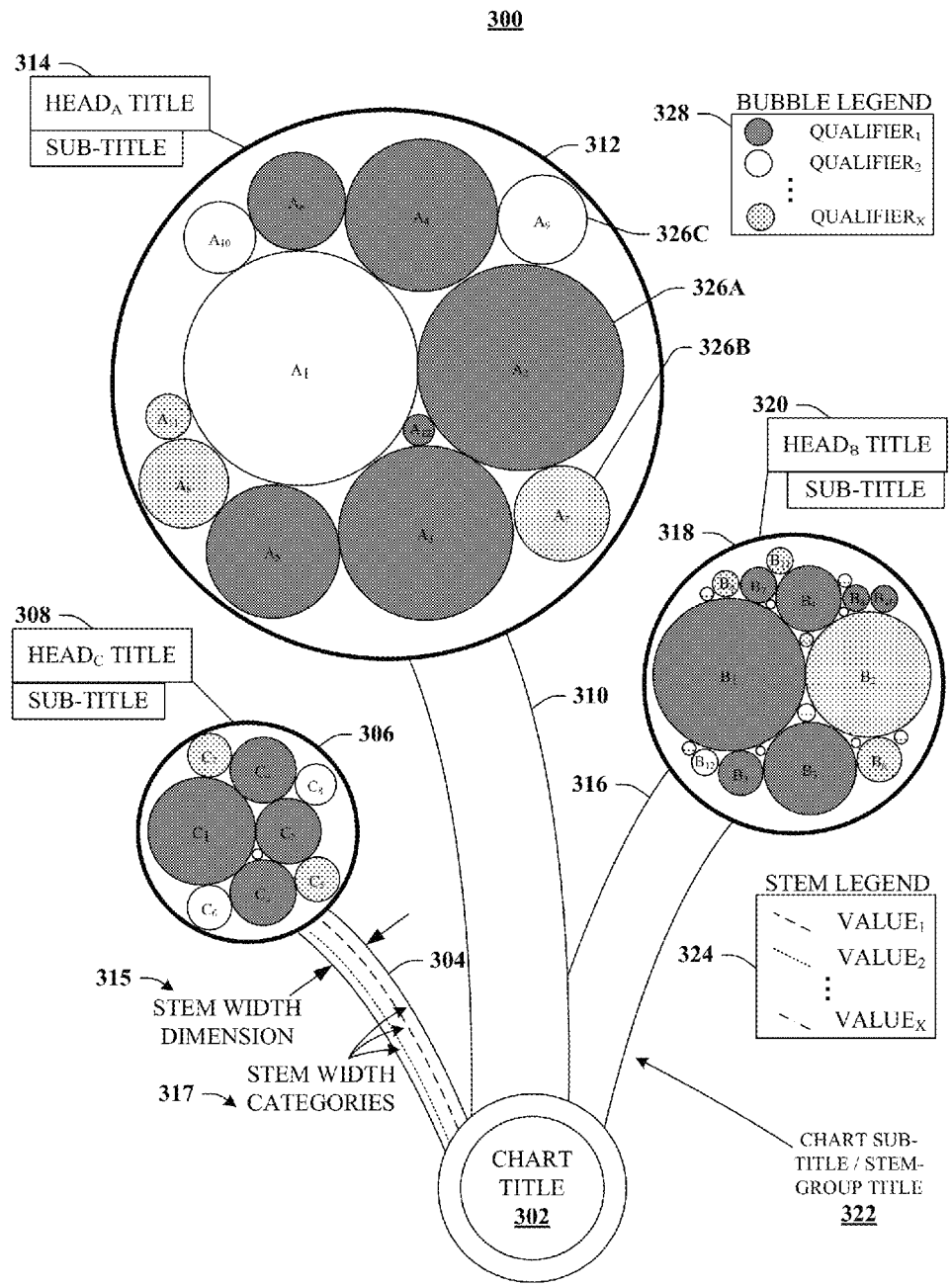
FIGS. 3 and 4 illustrate a diagram of an example display of multidimensional relational data in a broccoli shaped chart in specific aspects.

FIG. 3 illustrates a diagram of an example broccoli chart 300 according to particular aspects of the subject disclosure. Broccoli chart 300 can comprise a core primitive including a chart title 302. Further, broccoli chart 300 can comprise a first set of stems branching outward from the core primitive, including $stem_C$ 304, $stem_A$ 310 and $stem_B$ 316. A chart sub-title/stem-group title 322 can be associated with the first set of stems, indicating a general topic or high-level category to which data associated with the set of stems belongs.

According to a particular aspect, respective stems can have respective widths, depicted for example by stem width 315 of $stem_C$ 304. Stem width 315 can provide relational information pertaining to $stem_C$ 304 (e.g., as compared with widths of $stem_A$ 310 and $stem_B$ 316), adding an additional relative dimension for data associated with $stem_C$ 304 (including, e.g., a stem-head 306 and a set of bubbles contained therein, as depicted). Further, a stem can be divided into multiple stem width categories 317, providing yet another dimension of data. As a particular example, stem width categories 317 can specify respective percentages of different categories of bubbles included within stem-head 306. A stem legend 324 can be included to identify values (e.g., percentages) or categories of information defined to be associated with the respective stem width categories 317.

Each stem terminates in a stem-head having an associated respective title and optionally sub-title. Thus, $stem_C$ 304 terminates in stem-head 306 having a stem-head$_C$ title 308 and sub-title, $stem_A$ 310 terminates in a stem-head 312 having a stem-head$_A$ title 314 and sub-title, and stem$_B$ 316 terminates in a stem-head 318 having a stem-head$_B$ title 320 and sub-title.

Each stem-head includes a set of bubbles associated with the respective stem-heads. Stem-head 312 includes bubbles A1-A12, stem-head 318 includes bubbles B1-B20 (though the label of some bubbles is too small for discernment at the default zoom level), whereas stem-head 306 includes bubbles C1-C8. Moreover, as depicted, bubbles have three variations in shading, unshaded bubbles 326C, lightly shaded bubbles 326B and dark shaded bubbles 326A. The shading of bubbles can be correlated with a further dimension of the multidimensional data, providing yet another dimension that is graphically distinct and quickly discernable by a user. A bubble legend 328 can be included to specify different data qualifiers associated with respective bubble shadings. Also as depicted, sets of bubbles can be positioned tangential to other bubbles, without overlapping, to minimize graphical area required for displaying individual bubbles. Moreover, smaller bubbles can be positioned in spaces between other bubbles, also referred to as internal spaces (thereby creating additional, smaller internal spaces).

Figure 4:
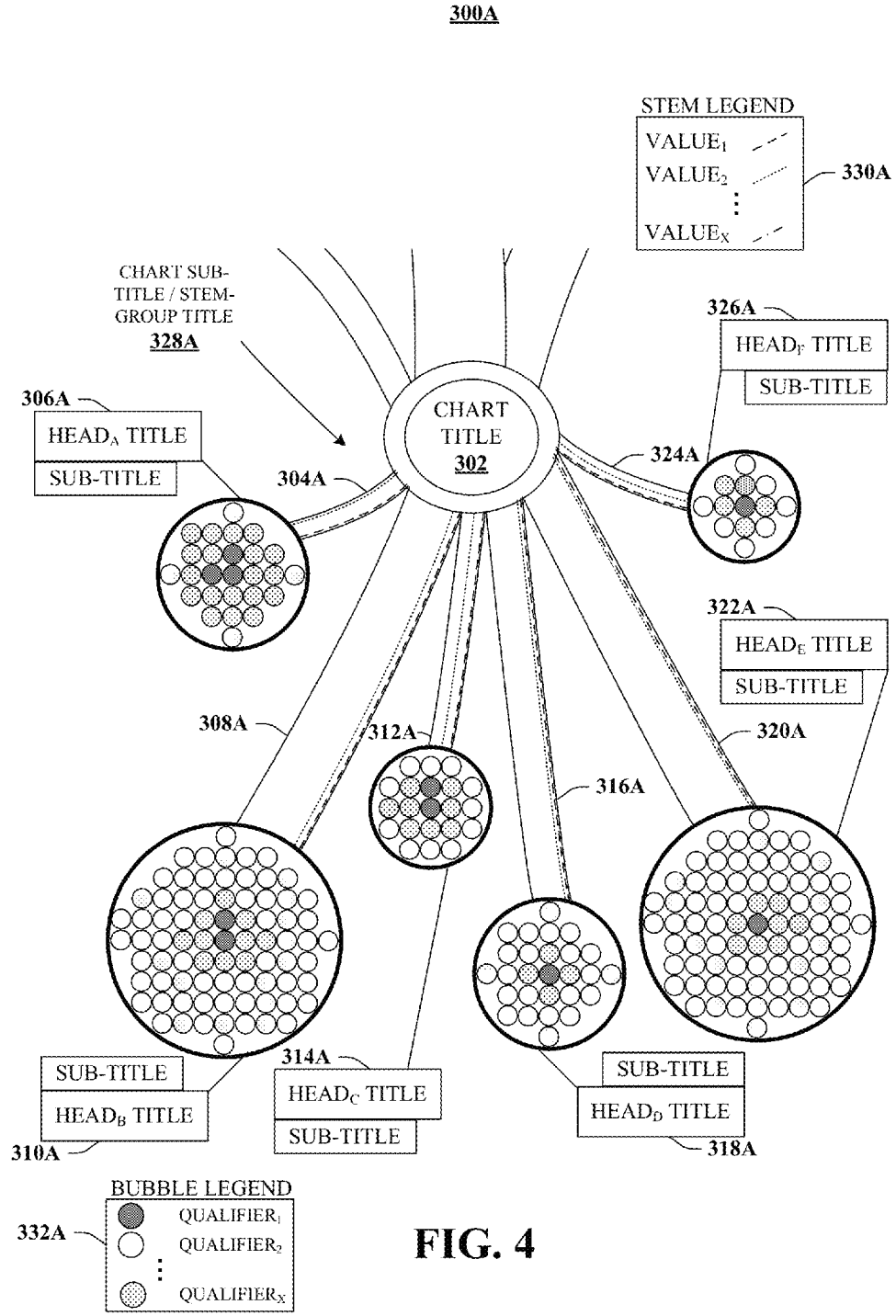

FIG. 4 illustrates a diagram 300A of a second group of stems associated with broccoli chart 300 of FIG. 3. The second group of stems comprises stem 304A, stem 308A, stem 312A, stem 316A, stem 320A and stem 324A, and can have a chart sub-title/stem-group title 328A independent of the first group of stems. Similar to the first group of stems, each of the second group of stems can terminate in a stem-head having a title (e.g., a label) and optionally one or more sub-titles associated therewith. Specifically, the stem-head of stem 304A has a title 306A, the stem-head of stem 308A has a title 310A, the stem-head of stem 312A has a title 314A, the stem-head of stem 316A has a title 318A, the stem-head of stem 320A has a title 322A, and the stem-head of stem 324A has a title 326A. Shading of bubbles can be categorized in a bubble legend 332A, whereas stem width and stem width categories can be categorized in a stem legend 330A. It is to be appreciated that, although each stem of broccoli chart 300 terminates in only a single stem-head, multiple stem-heads can be associated with a particular stem. This can result, for instance, where multiple sub-categories of data are associated with a higher level category associated with a particular stem.

Figure 5:
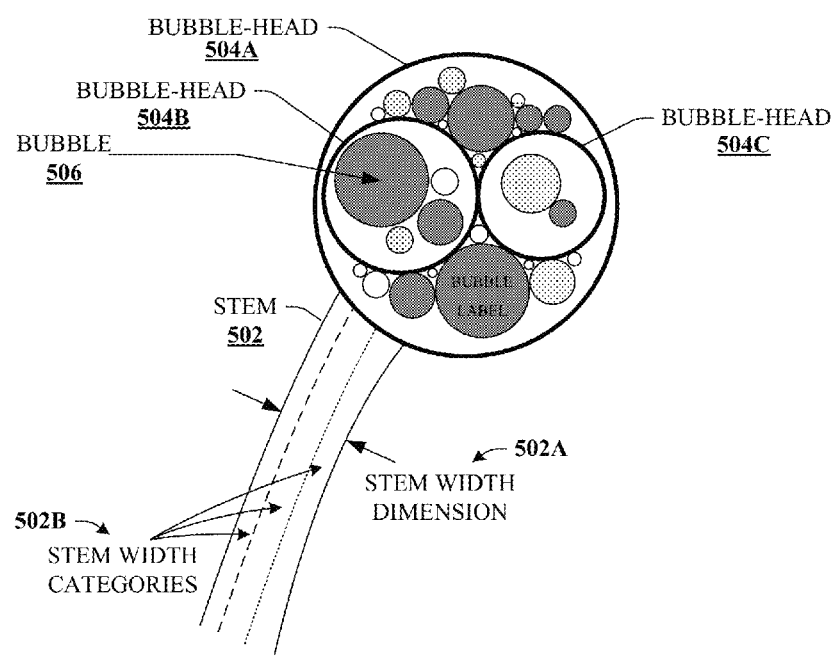
FIG. 5 illustrates an example stem and stem-head of a portion of a broccoli shaped graphical chart according to a particular aspect.

FIG. 5 illustrates a close-up view 500 of a stem having multiple stem-heads of a broccoli chart according to further aspects of the subject disclosure. Close-up view 500 includes a stem 502 terminating in a large stem-head 504A, and two smaller stem-heads, including stem-head 504B and stem-head 504C, each of which are contained within stem-head 504A in this example. It is to be appreciated, however, that one or more of stem-head 504B or stem-head 504C can partially overlap stem-head 504A, or be external to stem-head 504A. Moreover, stem-head 504B and stem-head 504C could partially or wholly overlap each other in some embodiments.

Stem 502 is associated with a stem width 502A that can add an additional dimension to data associated with stem 502. This additional dimension can be a relative dimension compared with other stems (not depicted) of a broccoli chart, or can be a dimension pertinent to data of stem 502 exclusively. Also as depicted, stem 502 can comprise stem width categories 502B, providing yet another dimension of data associated with stem 502. As a particular illustrative example, stem width 502A can represent a sum total of data quantities associated with bubbles 506 of stem 502, whereas stem width categories 502B can comprise respective totals of different bubble shadings of bubbles 506. For instance, a first of stem width categories 502B can indicate a relative total of quantities of dark shaded bubbles 506, a second of stem width categories 502B can indicate a relative total of quantities of lightly shaded bubbles 506, whereas a third of stem width categories 502B can indicate a relative total of quantities of unshaded bubbles 506.

In at least one aspect of the subject disclosure, stem-head 504B or stem-head 504C can also be bubbles within stem-head 504A. In this case, a data instance assigned to such a stem-head can also serve as a sub-category for data instances assigned to bubbles within the stem-head. By recursively positioning stem-heads within other stem-heads, additional dimensions of data can be stacked within stem-head 504A without adding further graphical area to the broccoli chart. Particularly, bubbles within such a stem-head can be made smaller, and graphical zooming can be utilized to expand the smaller bubbles to a viewable size.

As described herein, bubbles can be positioned within a stem-head according to a positioning algorithm. According to a particular aspect, the positioning algorithm can be a center of mass (or center of area) algorithm that can operate as follows. A center of a mass can initially be placed in a geographic center of an empty stem-head. A largest of a set of bubbles can be centered on the center of mass, and a second largest of the set of bubbles can be placed tangentially adjacent to the largest of the set of bubbles. The center of mass is then recalculated for the largest and second largest of the set of bubbles, and repositioned to a recalculated position. A third largest of the set of bubbles is then placed nearest to the recalculated center of mass position, so as to not overlap another bubble. The center of mass is then recalculated for the combined largest, second largest and third largest bubbles, and repositioned to a second recalculated position. A fourth largest of the set of bubbles is then positioned nearest the second recalculated position, and so on, until all bubbles are positioned within the stem-head, with the center of mass iteratively recalculated after positioning of each subsequent bubble. Additionally, the positioning algorithm can position bubbles in available space according to one of multiple mechanisms. In a first example, the positioning algorithm can simply analyze all available space within the stem-head and position a bubble within the nearest open space without overlapping a previously positioned bubble. In another example, the positioning algorithm can distinguish between internal open spaces—bounded by other bubbles, and external open spaces—at least partially unbounded by another bubble. In this example, the positioning algorithm can first analyze internal open spaces to fit a bubble, before analyzing external open spaces, or can first analyze external open spaces to fit the bubble, before analyzing internal open spaces. By distinguishing between internal and external open spaces, calculation time for positioning bubbles can be significantly decreased over other mechanisms.

Figure 6:
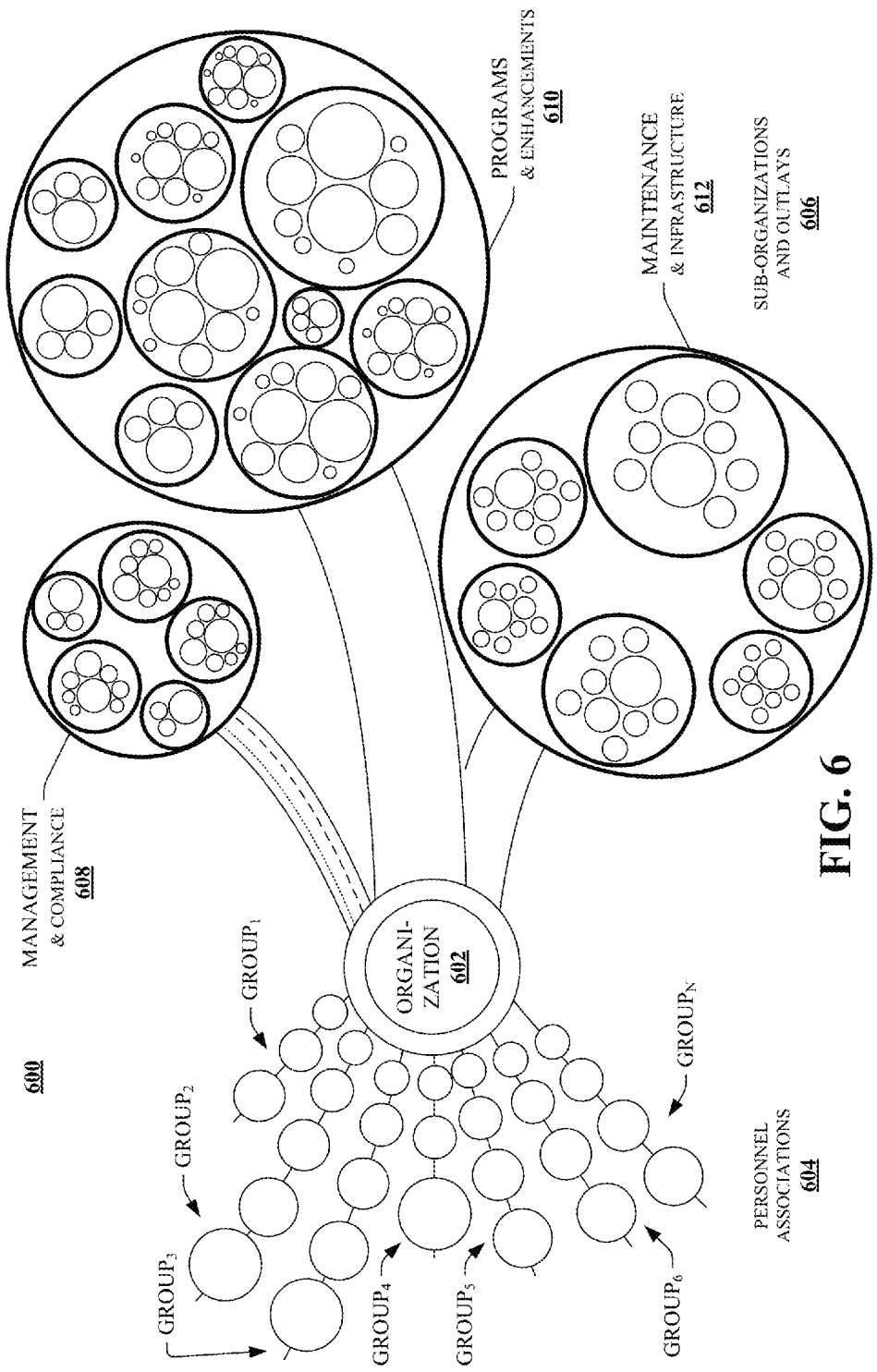
FIG. 6 depicts a sample organizational expenditure matrix depicted in a broccoli-shaped graphical chart according to still other aspects.

FIG. 6 illustrates a diagram of a broccoli chart 600 according to still other aspects of the subject disclosure. Broccoli chart 600 depicts an example high level chart of multidimensional business data representing, in this case, expense outlays for an organization. A core 602 of broccoli chart 600 can include an organization name for the broccoli chart 600. Additionally, a set of stems terminating in multiple stem-head groups are depicted, having a sub-title: sub-organizations and outlays 606 for the set of stems. Particularly, a first stem-head group 608 comprises a larger stem-head that represents management and compliance expense outlays for the organization. Moreover, smaller stem-heads within the larger stem-head can represent respective expense outlays of sub-groups of the management and compliance group, with respective sets of bubbles indicating specific expenses for those sub-groups. Further, a second stem-head group 610 comprises a larger stem-head that represents programs and enhancement expense outlays for the organization, comprising multiple smaller stem-heads representing sub-categories of the programs and enhancement group having respective sub-category expense outlays. Respective sets of bubbles likewise represent individual expense items for the respective sub-categories of the programs and enhancement group. In addition to the foregoing, a third stem-head group 612 represents a maintenance and infrastructure expense outlays for the organization, with smaller stem-heads representing sub-categories of the maintenance and infrastructure expense outlays, and each sub-category having a set of bubbles representing individual expense outlays of the third stem-head group 612.

In addition to the set of stems, broccoli chart 600 can comprise a set of personnel associations 604 associated with the expense outlays represented by the set of stems. Personnel associations 604 are divided into N groups, branching out from the core 602 of broccoli chart 600. Each of the N groups contains further sub-groups, represented by respective bubbles along the sub-groupings, which can further be associated with a number of individuals within respective sub-groups. The size of respective bubbles can, in at least one example embodiment, be dependent upon the number of individuals within the respective sub-groups associated with the respective bubbles. Thus, the personnel associations 604 provide a visual overview of size and number of personnel groups within the organization, concurrently with sub-organization and outlays 606 depicted in the stems and respective stem-head groups of broccoli chart 600.

Figure 7:
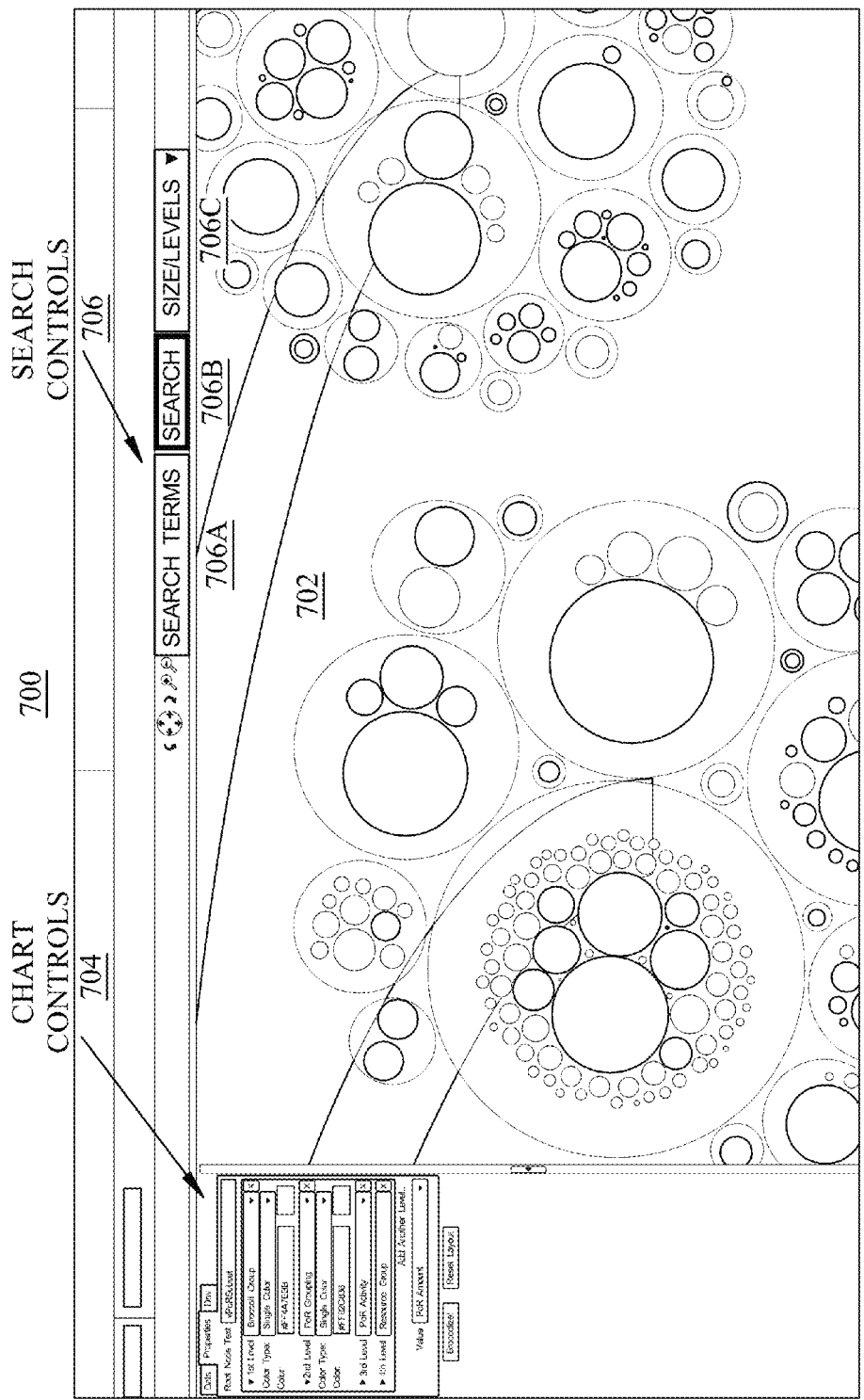
FIG. 7 illustrates example features of a broccoli-shaped graphical chart according to various aspects of the subject disclosure.

FIG. 7 depicts a diagram of a display 700 of a segment of a broccoli chart. Display 700 can comprise a computer application configured to generate and display the broccoli chart, for example. Moreover, display 700 can comprise a viewing area 702 for graphical representation of the broccoli chart. Display 700 can further comprise chart controls 704, providing a user interface for manual control over generation of the broccoli chart (e.g., see FIG. 8, infra). In at least one aspect of the subject disclosure, chart controls 704 can provide zooming functionality for viewing area 702. In one aspect, a subset of viewing area can be specified in chart controls 704 and enlarged to a full size of viewing area 702, or a predetermined subset of viewing area 702. In another aspect, a user selection can be made of a feature of broccoli chart in relation to zooming functionality. The selection can result in the feature being enlarged sufficiently to view data (e.g., text) represented by the feature, and a second selection can result in the feature being enlarged to the full size of viewing area 702 or the predetermined subset of viewing area 702. In another aspect, a mouse-over selection can be performed by moving a mouse over a feature. The mouse-over selection can result in data represented by the feature being enlarged for viewing, or displayed in a callout box, or the like.

In addition to the foregoing, display 700 can comprise search controls 706 comprising an input field 706A for entering search terms, a search command button 706B for executing a search of terms within input field 706A, and a size/levels selection 706C for selecting a dimension or level within the broccoli chart to focus the search. Search terms returned by a search can be highlighted within viewing area 702. Additionally, a highlighted term(s) selected (e.g., where selection can comprise a mouse click, a keyboard entry or entries, touch screen activation, light pen selection, or the like, or a suitable combination thereof) in response to a search can be enlarged to fit viewing area 702, or a predefined subset of viewing area 702, in a similar manner as described above in regard to zooming functionality of chart controls 704 or viewing area 702.

Figure 8:
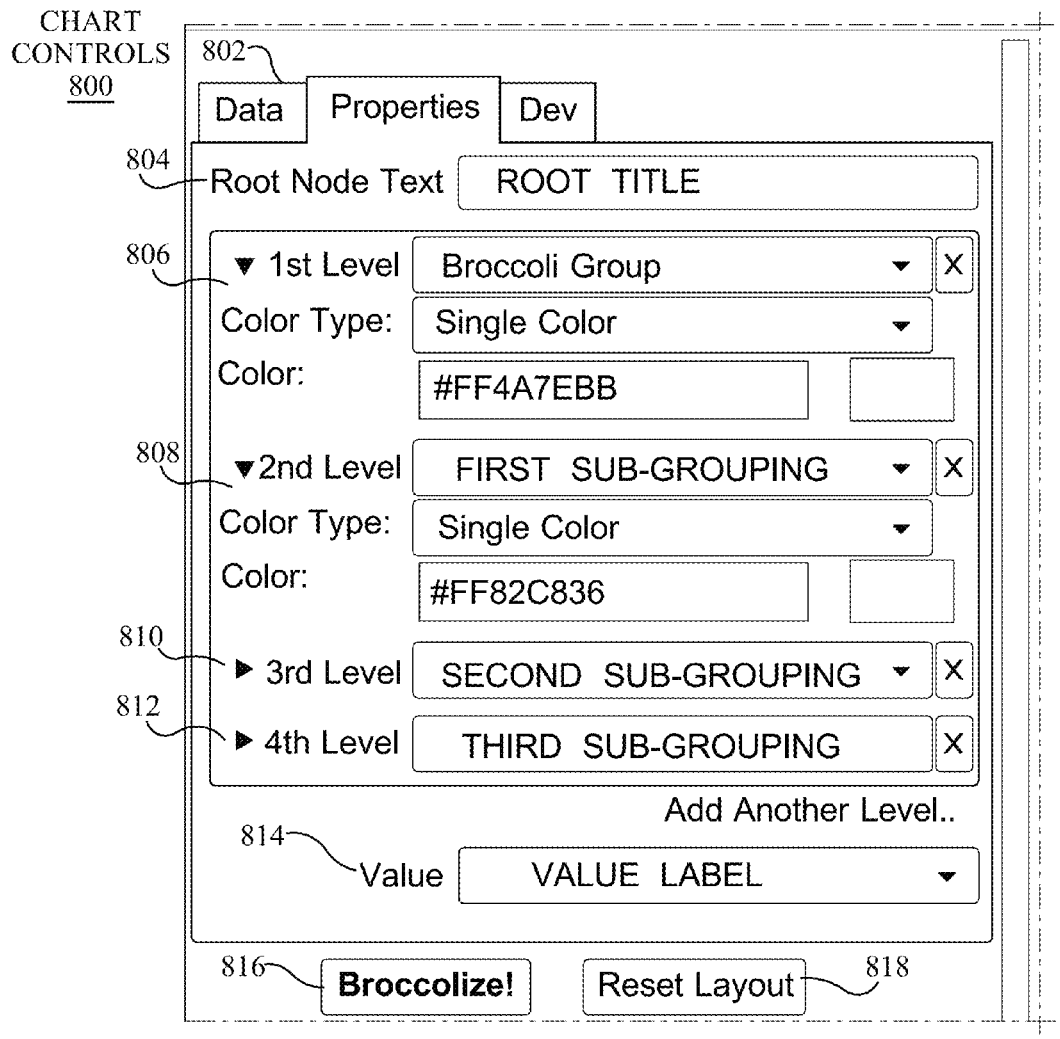
FIG. 8 depicts illustrates a sample graphic user control interface for user interface with multidimensional graphical charts described herein according to an aspect.

FIG. 8 illustrates a diagram of example chart controls 800 for a broccolizer application according to aspects of the subject disclosure. In at least one aspect, chart controls 800 can be substantially similar to chart controls 704 of FIG. 7, as described above. In other aspects, chart controls 800 can have some or all features of chart controls 704, in addition to other features described below.

Chart controls 800 can include a set of tabs 802. Tabs 802 can comprise a data tab for entering data, or pointing to data locations, or subsets of data included within a matrix of data. Additionally, tabs 802 can comprise a properties tab for associating subsets of the data with features of a broccoli chart, for defining different levels or dimensions of the broccoli chart, feature colors and properties (e.g., stem width, stem width categories, etc.) and so on. Furthermore, tabs 802 can comprise a development tab for providing programming control over the broccoli chart.

On a properties tab of tabs 802, chart controls can comprise a root node text for providing a root title of the broccoli chart (e.g., associated with a core primitive thereof). A first level control 806 enables entry of a title for a first level stem-head grouping of the broccoli chart (e.g., a largest stem-head comprising other smaller stem-heads), selection of color type, and selection of color for the high level grouping. A second level control 808 enables entry of a title for a second level stem-head grouping, within the first level stem-head grouping, selection of color type and selection of color for the second level stem-head grouping. Likewise, a third level stem-head grouping 810 and fourth level stem-head grouping 812 can enable entry of data for lower level stem-head groupings. Moreover, an "add level" command can enable addition of fifth level stem-head groupings, and so on.

Chart controls 800 can comprise a value field 814 for entering values associated with respective stem-head groupings. A broccolize! button 816 can execute generation and display of the broccoli chart based on data and properties entered in tabs 802. Generation and display of the broccoli chart can be substantially similar to that described above at FIGS. 1 and 2, supra, in at least one aspect of the subject disclosure. Further to the above, chart controls 800 can comprise a reset layout button 818 for resetting chart controls 800 data fields and selections to default values.

The aforementioned diagrams have been described with respect to interaction between several systems, apparatuses, components, electronic circuits, or optoelectronic devices. It should be appreciated that such diagrams can include those components or systems specified therein, some of the specified components, or additional components. For example, a system could include system 100 comprising broccolizer engine 200, and chart file 120, elements file 124 and database 106. Sub-components could also be implemented as architectures electrically connected to other sub-components rather than included within a parent architecture. Additionally, it should be noted that two or more components could be combined into a single component providing aggregate functionality. For instance, data categorization component 202 can include positioning component 214 to facilitate association of input data with broccoli chart features, and sizing and positioning of broccoli chart bubbles, by way of a single component. Components of the disclosed systems and apparatuses can also interact with one or more other components not specifically described herein but known by those of skill in the art, or made known to one of skill in the art by way of the context provided herein.

Figure 9:
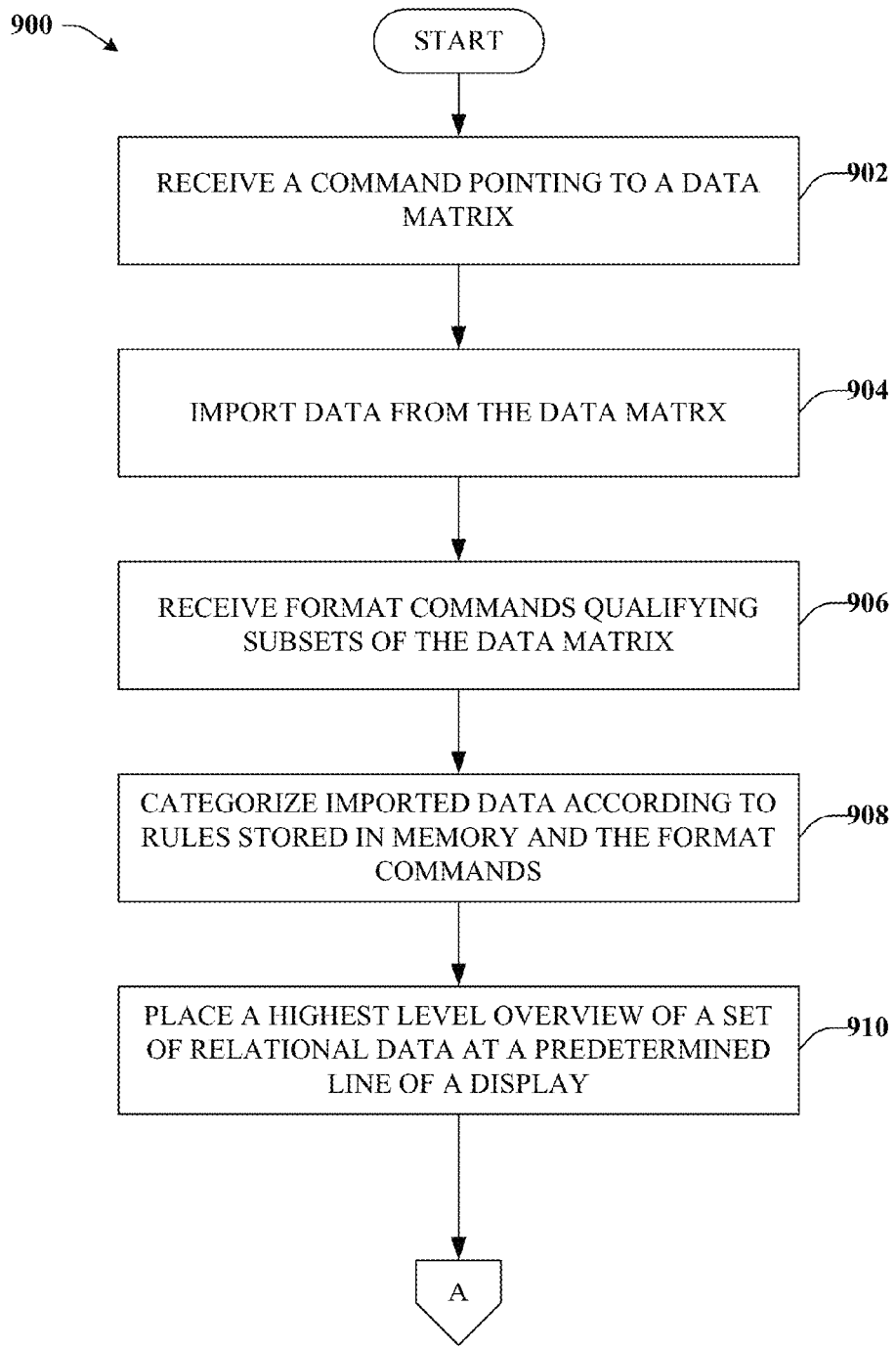
FIGS. 9, 10 and 11 illustrate a flow chart of a sample method for categorizing relational data and depicting a multidimensional data matrix as a graphical chart according to other aspects.
Figure 10:
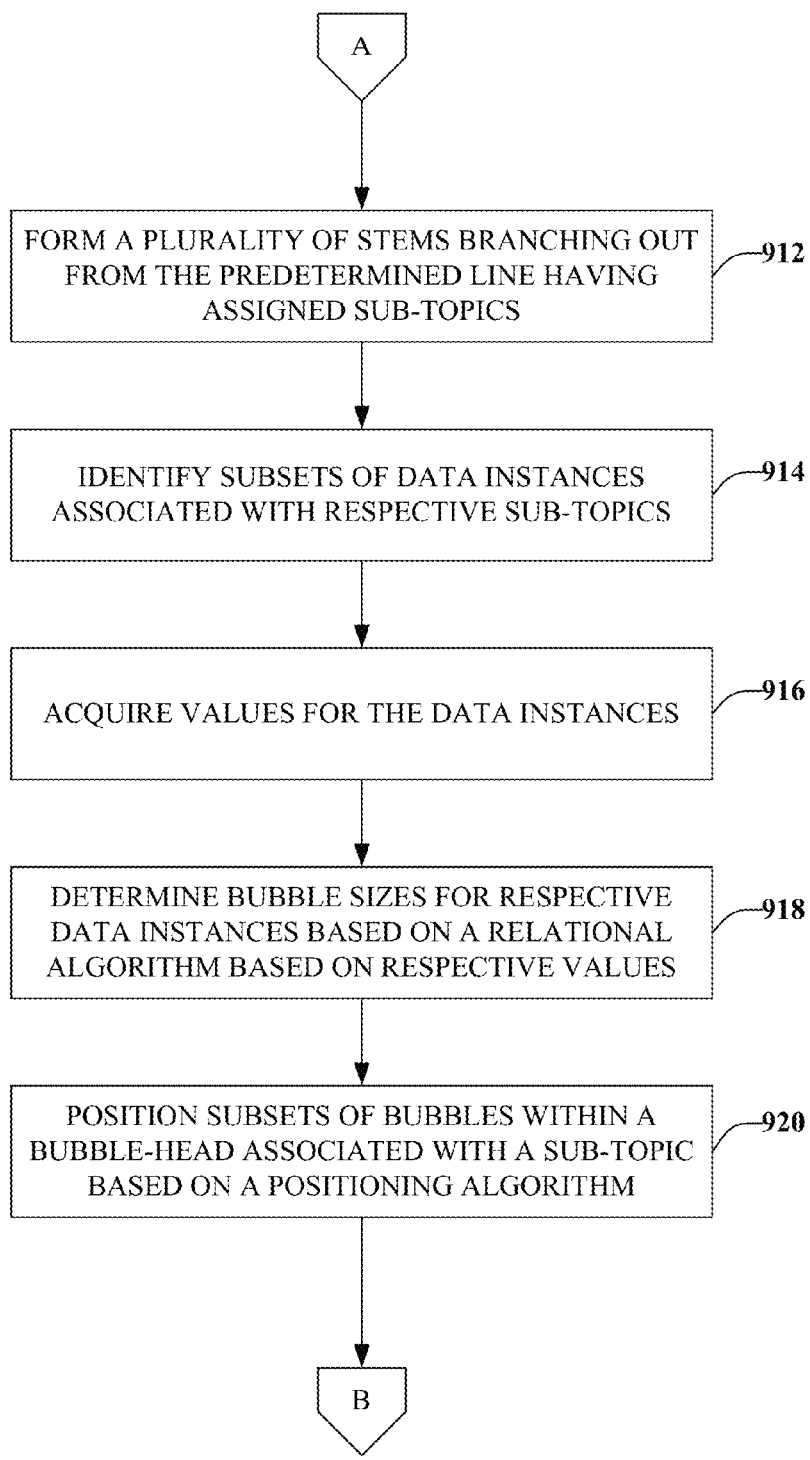
Figure 11:
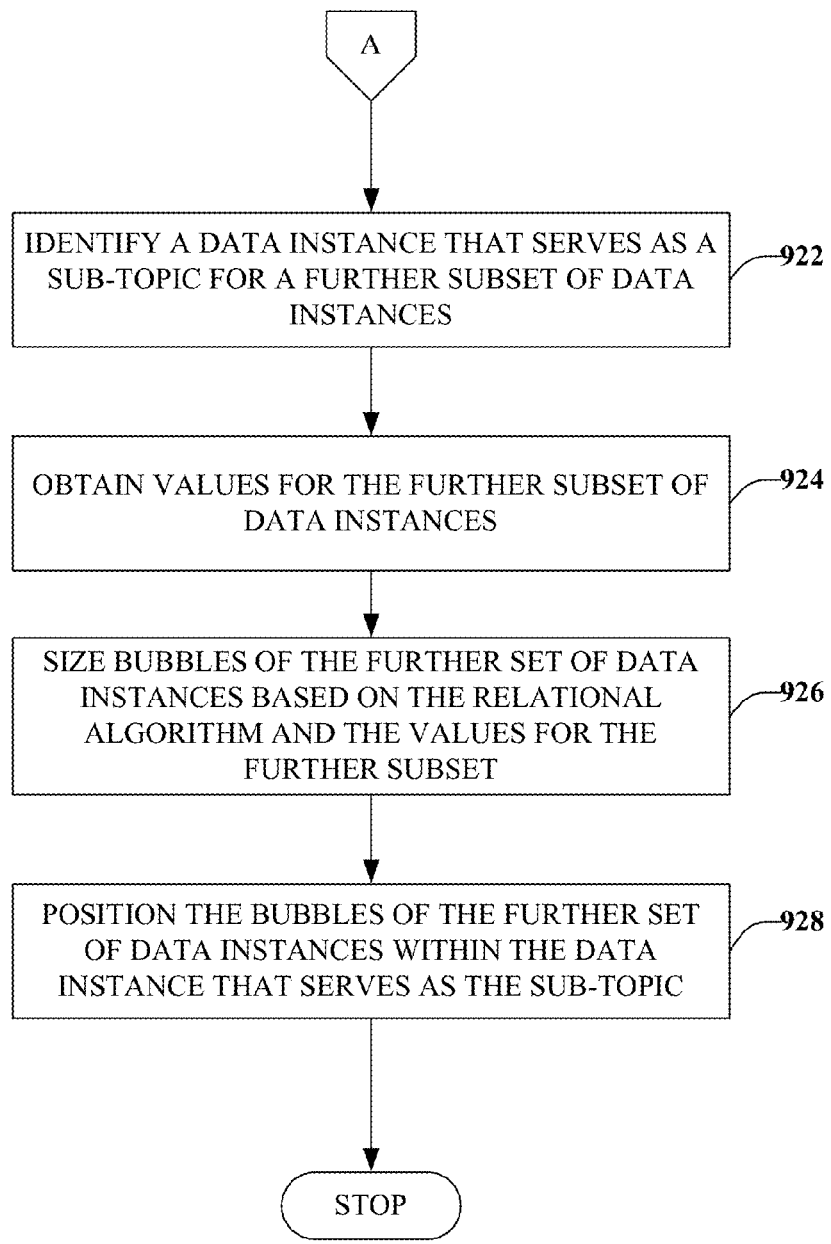

In view of the exemplary diagrams described supra, process methods that may be implemented in accordance with the disclosed subject matter will be better appreciated with reference to the flow chart of FIGS. 9-11. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Additionally, it should be further appreciated that the methods disclosed hereinafter and throughout this specification are capable of being stored on an article of manufacture to facilitate transporting and transferring such methods to an electronic device. As used herein, the terms "computer-readable device", "storage medium", "device" used in conjunction with a carrier, and the like, as used herein are strictly limited to referring to an article(s) of manufacture. Further, the term "computing device" s used herein is also strictly limited to referring to an article(s) of manufacture.

FIGS. 9, 10 and 11 illustrate a flowchart of a sample method 900 for generating a graphical display of multidimensional data according to aspects of the subject disclosure. At 902, method 900 can comprise receiving a command pointing to a data matrix for generating the graphical display. At 904, method 900 can comprise importing data from the data matrix. At 906, method 900 can comprise receiving format commands qualifying subsets of the data matrix. At 908, method 900 can comprise categorizing imported data according to rules stored in memory, or in accordance with the format commands, or a combination thereof.

At 910, method 900 can comprise placing a highest level overview of a set of relational data at a predetermined line of a display. At 912, method 900 can comprise forming a plurality of stems branching out from the predetermined line having assigned sub-topics. At 914, method 900 can comprise identifying subsets of data instances associated with respective sub-topics. Further, at 916, method 900 can comprise acquiring values for the data instances. At 918, method 900 can comprise determining bubble sizes for respective data instances based on a relational algorithm utilizing the respective values. At 920, method 900 can comprise positioning subsets of bubbles within a bubble-head associated with a sub-topic based on a positioning algorithm.

At 922, method 900 can comprise identifying a data instance that serves as a sub-topic for a further subset of data instances. At 924, method 900 can comprise obtaining values for the further subset of data instances, and at 926, method 900 can comprise sizing bubbles of the further set of data instances based on the relational algorithm and the values for the further subset. At 928, method 900 can comprise positioning the bubbles of the further set of data instances within the data instance that serves as the sub-topic.

In a particular aspect, method 900 can comprise coloring or shading one of the plurality of stems, wherein the color or shade qualifies respective sub-topics of a set of relational data associated with one or more of the plurality of stems, to add an additional dimension to the respective sub-topic of the set of relational data. In a further aspect, method 900 can comprise selecting one of a set of widths for one of the plurality of stems, wherein the one of the set of widths qualifies the respective sub-topic of the set of relational data associated with the one of the plurality of stems, to add an additional dimension to the respective sub-topic of the set of relational data. In alternative or additional aspects, method 900 can comprise selecting one of a set of lengths for one of the plurality of stems, wherein the one of the set of lengths qualifies the respective sub-topic of the set of relational data associated with the one of the plurality of stems, to add an additional dimension to the respective sub-topic of the set of relational data. According to at least one aspect, method 900 can comprise forming a stalk at the predetermined line of the two-dimensional display encompassing the highest level overview, the stalk having a width substantially equivalent to the combined widths of the plurality of stems.

In yet other aspects of the subject disclosure, method 900 can comprise forming respective sets of bubbles near an end of each of the plurality of stems. Method 900 can additionally comprise including a respective instance of the set of relational data with respective bubbles of one of the sets of bubbles near a particular one of the plurality of stems, wherein each respective instance of the set of relational data is pertinent to one of the sub-topics of the set of relational data assigned to the particular one of the plurality of stems. In an alternative or additional aspect, method 900 can comprise arranging the stalk, plurality of stems and the bubble in a shape that is similar to the shape of a broccoli plant.

In a further aspect, method 900 can comprise forming one or more additional bubbles within the bubble, wherein each of the one or more additional bubbles comprises a respective further instance of the set of relational data, and wherein the bubble serves as a head for the one or more additional bubbles. The method can further comprise selecting the respective further instances of the set of relational data to be sub-related to the instance of relational data included with the head. Alternatively, or in addition, the method can comprise positioning the one or more additional bubbles within the head in accordance with a rule of gravitational organization. Particularly, the method can comprise positioning larger bubbles of the one or more additional bubbles nearer to the center of the head in accordance with relative area of the one or more additional bubbles. The method can also comprise positioning smaller bubbles of the one or more additional bubbles among larger bubbles of the one or more additional bubbles. In at least one particular aspect, the positioning can comprise bubbles being positioned such that a subset of the one or more additional bubbles is placed co-tangentially with a second subset of the one or more additional bubbles within the head.

Exemplary Networked and Distributed Environments

One of ordinary skill in the art can appreciate that the various embodiments for display of multidimensional data and interaction therewith described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the mechanisms for graphical display generation as described for various embodiments of the subject disclosure.

Figure 12:
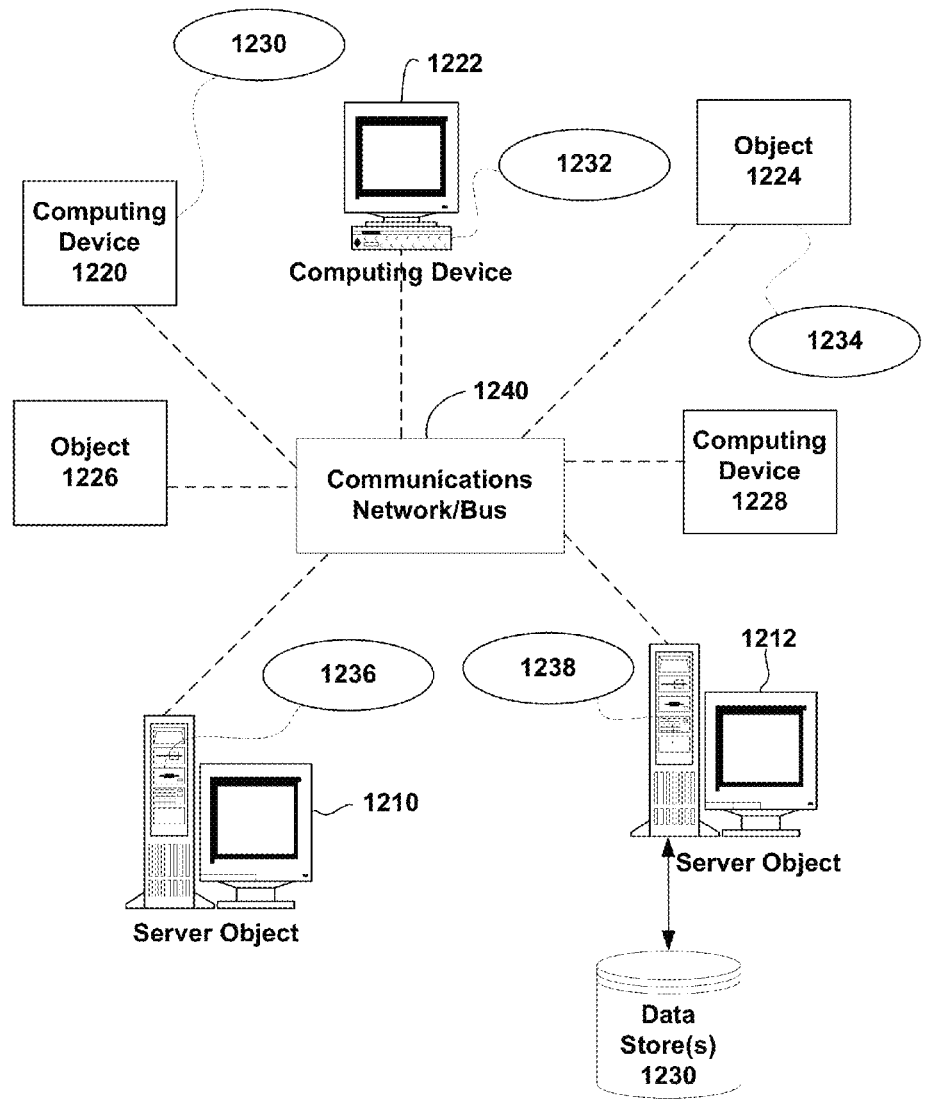
FIG. 12 illustrates a block diagram representing exemplary non-limiting networked environments in which various embodiments described herein can be implemented.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 12, communications network 1242 may comprise other computing objects and computing devices that provide services to the system of FIG. 12, and/or may represent multiple interconnected networks, which are not shown. Each computing object 1210, 1212, etc. or computing object or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the techniques for dynamic code generation provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for dynamic code generation as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Exemplary Computing Device

As mentioned, advantageously, the techniques described herein can be applied to any device where it is desirable to generate multidimensional graphical displays with high user data consumption, in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 13 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 13:
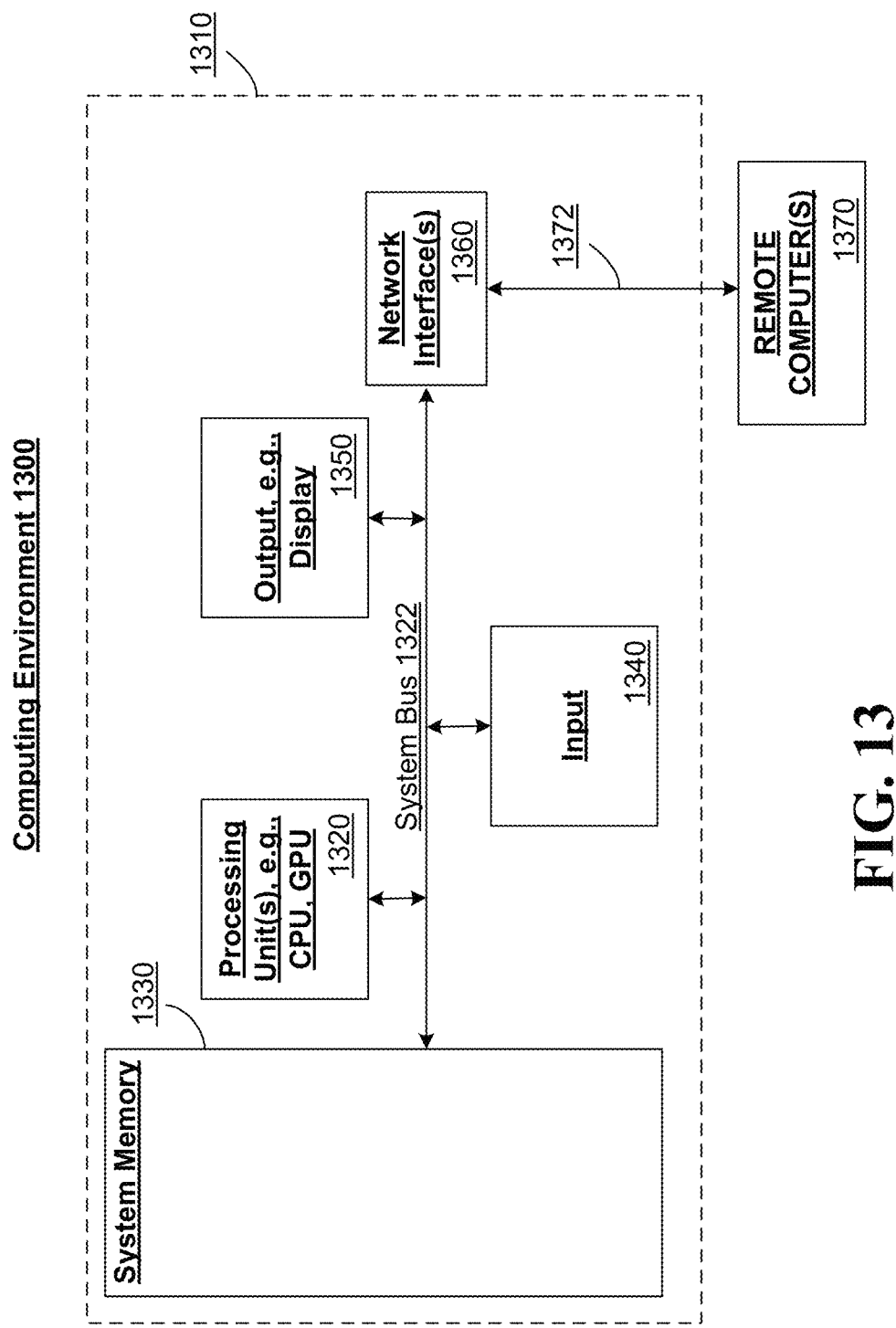
FIG. 13 depicts a block diagram representing an exemplary non-limiting computing system or operating environment in which one or more aspects of various embodiments described herein can be implemented.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither should the computing system environment 1300 be interpreted as having any dependency or requirement relating to any one or combination of components illustrated in the exemplary computing system environment 1300.

With reference to FIG. 13, an exemplary remote device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data. According to a further example, computer 1310 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections, such as network interfaces 1360, to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the various embodiments should not be limited to any single embodiment, but rather should be construed in breadth, spirit and scope in accordance with the appended claims.

What is claimed is:

1. A method performed on a computing device, the method for visualizing multidimensional data on a graphical display, the method comprising:
    positioning, by the computing device, a highest level overview of a set of relational data near a predefined line of the graphical display;
    forming, by the computing device, a plurality of stems that branch outward from the predefined line, and assigning respective sub-topics of the set of relational data to respective ones of the plurality of stems;
    generating, by the computing device, a bubble near an end of one of the plurality of stems, and including with the bubble an instance of relational data that is pertinent to a particular sub-topic assigned to the one of the plurality of stems; and
    selecting one of a set of widths for one of the plurality of stems, where the one of the set of widths qualifies the respective sub-topic of the set of relational data associated with the one of the plurality of stems, to add an additional dimension to the respective sub-topic of the set of relational data.

2. The method of claim 1, further comprising:
    forming respective sets of bubbles near an end of each of the plurality of stems; and
    including a respective instance of the set of relational data with respective bubbles of one of the sets of bubbles near a particular one of the plurality of stems; wherein:
        each respective instance of the set of relational data is pertinent to one of the sub-topics of the set of relational data assigned to the particular one of the plurality of stems.

3. The method of claim 1, further comprising forming one or more additional bubbles within the bubble, wherein each of the one or more additional bubbles comprises a respective further instance of the set of relational data, and wherein the bubble serves as a head for the one or more additional bubbles.

4. The method of claim 3, further comprising selecting the respective further instances of the set of relational data to be sub-related to the instance of relational data included with the head.

5. The method of claim 3, further comprising positioning the one or more additional bubbles within the head in accordance with a rule of gravitational organization.

6. The method of claim 5, further comprising positioning larger bubbles of the one or more additional bubbles nearer to the center of the head in accordance with relative area of the one or more additional bubbles.

7. The method of claim 5, further comprising positioning smaller bubbles of the one or more additional bubbles among larger bubbles of the one or more additional bubbles.

8. The method of claim 3, wherein a subset of the one or more additional bubbles is placed co-tangentially with a second subset of the one or more additional bubbles within the head.

9. The method of claim 1, further comprising forming another bubble near the end of the one of the plurality of stems that encompasses at least the bubble, and that serves as a head for the bubble, wherein the head includes a further instance of the set of relational data that serves as a higher-level category for the instance of the set of relational data at least within the context of the set of the relational data.

10. The method of claim 1, further comprising coloring or shading the bubble wherein the color or shade qualifies the instance of relational data, to add an additional dimension to the instance of relational data.

11. The method of claim 1, further comprising coloring or shading one of the plurality of stems wherein the color or shade qualifies the respective sub-topic of the set of relational data associated with the one of the plurality of stems, to add an additional dimension to the respective sub-topic of the set of relational data.

12. The method of claim 1, further comprising selecting one of a set of lengths for one of the plurality of stems, wherein the one of the set of lengths qualifies the respective sub-topic of the set of relational data associated with the one of the plurality of stems, to add an additional dimension to the respective sub-topic of the set of relational data.

13. The method of claim 1, further comprising forming a stalk at the predetermined line of the graphical display encompassing the highest level overview, the stalk having a width substantially equivalent to the combined widths of the plurality of stems.

14. The method of claim 1, further comprising arranging the stalk, plurality of stems and the bubble in a shape that is similar to the shape of a broccoli plant.

15. An apparatus for categorizing and graphically displaying multidimensional data in a chart, the apparatus comprising a processor that facilitates executing instructions stored in memory to generate the chart, comprising:
  a plurality of stems branching outward from a core associated with a highest level overview of the multidimensional data and terminating in respective stem-heads, the respective stem-heads are assigned respective sub-topics of the multidimensional data, where one of a set of widths is selected for one of the plurality of stems, where the one of the set of widths qualifies the respective sub-topic of the set of relational data associated with the one of the plurality of stems, to add an additional dimension to the respective sub-topic of the set of relational data; and
  a set of bubbles located within at least one of the respective stem-heads and positioned within the at least one of the respective stem-heads according to a positioning algorithm, where respective bubbles of the set of bubbles include respective instances of the multidimensional data that are pertinent to a sub-topic assigned to the at least one of the respective stem-heads.

16. The apparatus of claim 15, wherein at least one of:
  the highest level overview corresponds with a first dimension of the multidimensional data;
  the respective sub-topics collectively form a second dimension of the multidimensional data; or
  the respective instances of the multidimensional data form a third dimension of the multidimensional data.

17. The apparatus of claim 16, wherein at least one of:
  a diameter or color of the at least one of the plurality of stem-heads; or
  a width or color of one of the plurality of stems terminating in the at least one of the respective stem-heads, qualifies the sub-topic and the respective instances of the multidimensional data to add a further dimension of the multidimensional data.

18. The apparatus of claim 15, wherein at least one bubble of the set of bubbles serves as a head for an additional set of bubbles contained within the at least one bubble, and wherein further instances of the multidimensional data associated with the additional set of bubbles are pertinent to one of the respective instances of the multidimensional data associated with the at least one bubble.

* * * * *